United States Patent

Stingelin et al.

Patent Number: 4,462,805
Date of Patent: Jul. 31, 1984

[54] MIXTURE OF CATIONIC COMPOUNDS FOR DYEING AND PRINTING TEXTILES, LEATHER AND PAPER

[75] Inventors: Willy Stingelin, Reinach; Peter Loew, Münchenstein, both of Switzerland

[73] Assignee: Ciba-Geigy Corporation, Ardsley, N.Y.

[21] Appl. No.: 493,183

[22] Filed: May 10, 1983

[30] Foreign Application Priority Data

May 18, 1982 [CH] Switzerland .......... 3050/82

[51] Int. Cl.³ .............................. D06P 3/32
[52] U.S. Cl. .......................... 8/436; 8/539; 8/644; 8/688; 8/918; 8/919; 8/922; 8/924; 8/927; 524/400; 524/417
[58] Field of Search ............ 8/644, 688, 539, 436; 542/400, 417

[56] References Cited

U.S. PATENT DOCUMENTS

| | | | |
|---|---|---|---|
| 3,379,723 | 4/1968 | Clarke | 524/457 |
| 3,459,729 | 8/1969 | Crotti et al. | 8/688 |
| 3,514,453 | 5/1970 | Spatz et al. | 542/466 |
| 4,009,000 | 2/1977 | Buhler | 8/688 |
| 4,042,322 | 8/1977 | Kuhlthau | 8/539 |
| 4,410,332 | 10/1983 | Herrmann et al. | 8/644 |

FOREIGN PATENT DOCUMENTS 89566 9/1983 European Pat. Off. .
1577842 10/1980 United Kingdom .

Primary Examiner—A. Lionel Clingman
Attorney, Agent, or Firm—Edward McC. Roberts

[57] ABSTRACT

A mixture of cationic compounds of the formulae

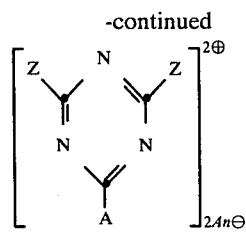

-continued

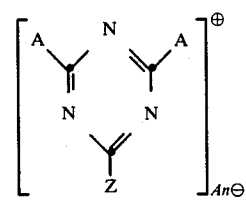

is obtained by reaction of a compound of the formula

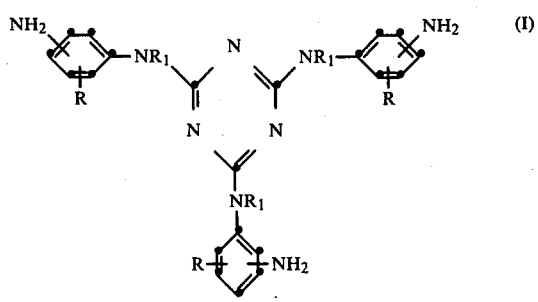

with an aldehyde of the formula II

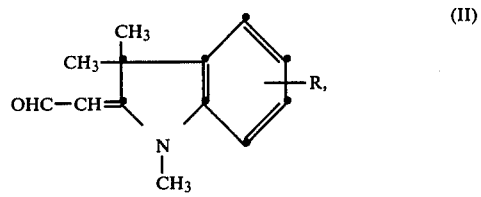

in an aqueous or organic medium, in the presence of an acid, in which formulae, the symbols have the meanings defined in claim 1. The mixtures obtained are suitable in particular for the dyeing of paper, whereby neutral-yellow dyeings are obtained.

18 Claims, No Drawings

MIXTURE OF CATIONIC COMPOUNDS FOR DYEING AND PRINTING TEXTILES, LEATHER AND PAPER

The invention relates to a process for producing a novel mixture of cationic compounds, to the mixture obtained by the process, and to the use thereof for dyeing and printing textile materials, leather and paper.

The novel mixture consists of at least two cationic compounds of the formulae

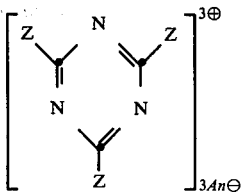 III

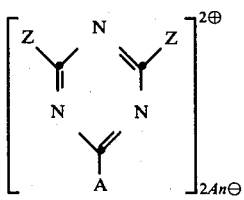 IIIa

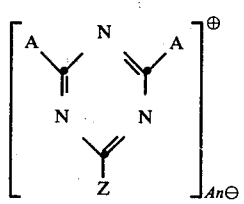 IIIb wherein
Z is a radical of the formula

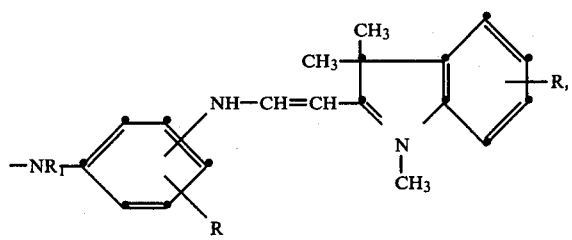

A is a radical of the formula

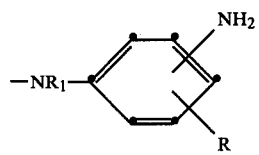

wherein R is hydrogen, $C_1$–$C_4$-alkyl, $C_1$–$C_4$-alkoxy or halogen, and $R_1$ is hydrogen or $C_1$–$C_4$-alkyl, and An is an anion,
which mixture is obtained by reaction of a compound of the formula I

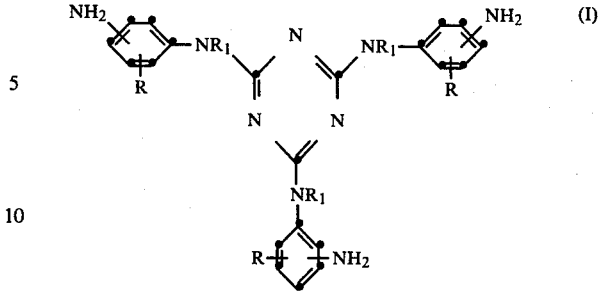

with an aldehyde compound of the formula II

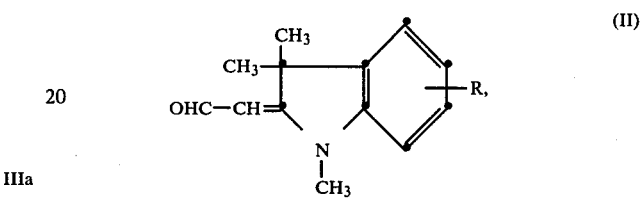

in an aqueous or organic medium, in the presence of an acid, in which formulae the symbols R and $R_1$ have the meanings defined in the foregoing.

As $C_1$–$C_4$-alkyl, R and $R_1$ are each a straight-chain or branched-chain alkyl group, for example a methyl, ethyl, n- or iso-propyl group or n-, sec- or tert-butyl group.

Where R is $C_1$–$C_4$-alkoxy, it is a straight-chain or branched-chain alkoxy group, for example the methoxy, ethoxy, n- and iso-propoxy or n- and tert-butoxy group.

As a halogen atom, R is in particular the fluorine, chlorine or bromine atom.

It is also possible for the substituent R to occur several times in one and the same benzene ring.

R and $R_1$ are preferably each hydrogen.

In the case of this mixture of compounds, it can be for example one consisting of two or three components of the formulae III, IIIa and IIIb, which components can be, with regard to the substituents R and $R_1$, identical or different; and these components can be present as isomers, in that for example the $NH_2$ group in the radical A and NH group in the radical Z can be in the one case in the para-position and in the other case in the meta-position with respect to the $NR_1$ group.

In the preferred mixtures, R in each case is hydrogen, and the —NH and $NH_2$ groups in Z and A, respectively, are bound in the p-position with respect to the —$NR_1$ bridge. Furthermore, preferred mixtures consist of the compounds of the formulae III and IIIa and particularly of the compounds of the formulae III, IIIa and IIIb.

Anions An are both inorganic and organic anions: they are for example the halide ion, such as the chloride, bromide or iodide ion, also the sulfate, methylsulfate, aminosulfate, perchlorate, carbonate, bicarbonate, phosphate, phosphomolybdic, phosphotungstic, phosphotungstomolybdic, benzenesulfonate, naphthalenesulfonate, 4-chlorobenzenesulfonate, oxalate, maleate, formate, acetate, propionate, lactate, succinate, chloroacetate, tartrate, methanesulfonate or benzoate ions, or complex anions, such as those of zinc chloride double salts.

Preferred anions An are the formate, acetate, lactate, chloride, sulfate and phosphate ions.

When the compound of the formula I is reacted with the aldehyde compound of the formula II in an aqueous medium, the reaction can be performed at a temperature of 0° to 100° C. Where the reaction is performed in an organic medium, for example in an aliphatic alcohol, such as ethanol, or cellosolve, the reaction temperature is 0° to 50° C. The reaction in both cases is carried out in the presence of an acid HAn. This acid is for example an organic acid, such as formic acid, acetic acid, lactic acid or arylosulfonic acid, especially benzenesulfonic acid; or an inorganic acid, such as hydrochloric acid, sulfuric acid or phosphoric acid.

The compound of the formula II is used preferably in an amount of 1.2–2.99 mols, and particularly in an amount of 2.8–2.99 mols, relative to 1 mol of the triazine compound.

After the condensation reaction of the compound I with the compound II, the novel mixtures are optionally separated from the reaction medium and dried. If desired or necessary, the anion An in the cationic mixtures can be exchanged, in a known manner, for another anion.

The compounds of the formula I are known and can be produced in a known manner. One possibility for example is to react, in the symmetrical trichlorotriazine, the chlorine atoms stepwise with identical or different compounds of the formula

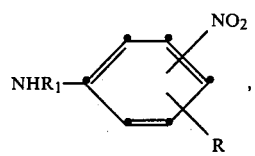

and to subsequently reduce in the condensation product the $NO_2$ group to the $NH_2$ group.

The aldehyde compounds of the formula II are likewise known and can be produced by known methods. Aldehyde compounds are for example: 1,3,3-trimethyl-2-methylene-indoline-ω-aldehyde and 1,3,3-trimethyl-5-chloro-2-methylene-indoline-ω-aldehyde.

The novel mixtures of compounds can be converted directly, after concentration by evaporation of the reaction medium, into a liquid commercial form.

The novel mixtures of the invention are used for dyeing and, with the addition of binders and optionally solvents, for printing materials dyeable with cationic dyes, especially textile materials which consist, for example, advantageously of homo- or copolymers of acrylonitrile; or synthetic polyamides or polyesters modified by acid groups. Dyeing is preferably performed in an aqueous, neutral or acid medium by the exhaust process, optionally under pressure, or by the continuous process. The testile material can be in the most varied forms: for example in the form of fibres, filaments, fabrics or knitwear, or piece goods and finished articles, such as shirts or pullovers.

There can be produced by application of the dyes level, greenish- to reddish-yellow dyeings and printings which are distinguished by very good general fastness properties.

The novel mixtures can be used also for dyeing and printing natural and regenerated cellulose materials, in particular cotton and viscose, in which cases there are likewise obtained greenish- to reddish-yellow, deeply coloured dyeings. The novel mixtures have on these textile materials good substantivity and a high degree of exhaustion, and the dyeings obtained have very good fastness properties, especially very good fastness to wet processing.

A further use of the novel mixtures is for the dyeing of paper of all types, particularly bleached, unsized and sized, lignin-free paper. These mixtures are more especially suitable for dyeing unsized paper (serviettes) by virtue of their very high affinity for their substrate.

The novel mixtures exhaust very well onto these substrates, the waste liquors being left colourless, a factor which is of great ecological advantage, in particular in view of the present-day effluent laws.

The dyeings obtained are fast to wet processing, that is to say, they exhibit no tendency to bleed when dyed paper in the wet state is brought into contact with moist white paper. This property is especially desirable for serviettes (tissues), in the case of which it is foreseeable that the dyed paper in the wet condition (for example soaked with water, alcohol, tenside solution, and the like) will come into contact with other surfaces, such as those of textiles, paper, and so forth, which have to be protected from becoming contaminated.

The high affinity for paper and the high rate of exhaustion of the novel dye mixtures are of great advantage in the continuous dyeing of paper, and thus render possible a much wider field of application of this known economical process.

Finally, the novel mixtures can be used also for dyeing leather (by for example spraying, brushing and dipping), and for the preparation of inks.

The following Examples further illustrate the invention without the scope thereof being limited by them. The term 'parts' denotes parts by weight, and % values are percent by weight. The abbreviation RKN is a quality designation and indicates the degree of purity of the cellulose; the abbreviation SR (=Schopper-Riegler) denotes the freeness value.

EXAMPLE 1

8.8 parts (1 mol) of 2,4,6-s-tri-(4'-aminophenylamino)-triazine and 12.0 parts (2.7 mols) of 1,3,3-trimethyl-2-methyleneindoline-ω-aldehyde are stirred up in 52 parts of ethanol and 3.0 parts of 85% aqueous formic acid for 10 hours at 20° to 30° C. The ethanol is distilled off in vacuo, and the dye which has precipitated is dried at 50° to 60° C. The yield is 23.4 parts of a yellow dye mixture of the following structure:

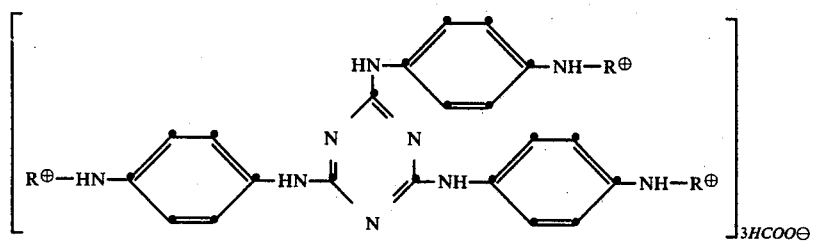

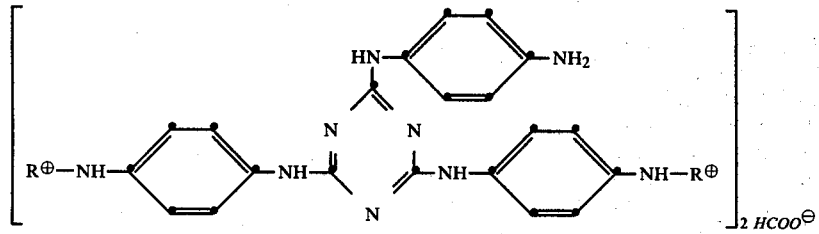

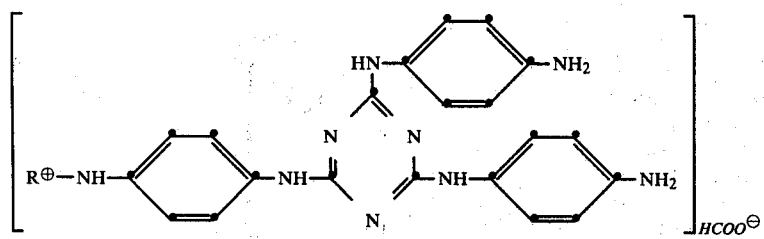

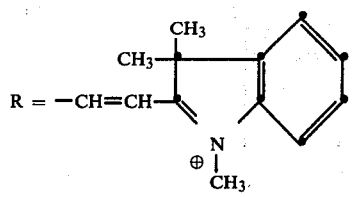

EXAMPLE 2

8.8 parts (1 mol) of 2,4,6-s-tri-(4'-aminophenylamino)-triazine and 13.0 parts (2.95 mols) of 1,3,3-trimethyl-2-methyleneindoline-ω-aldehyde are stirred, for 10 hours at 20°-30° C., in 52 parts of methanol and 8.2 parts of 87% aqueous 2-hydroxypropionic acid. The methanol is then distilled off in vacuo, and the dye which has precipitated is dried at 50°-60° C. The yield is 26.5 parts of a yellow dye mixture of the following structure:

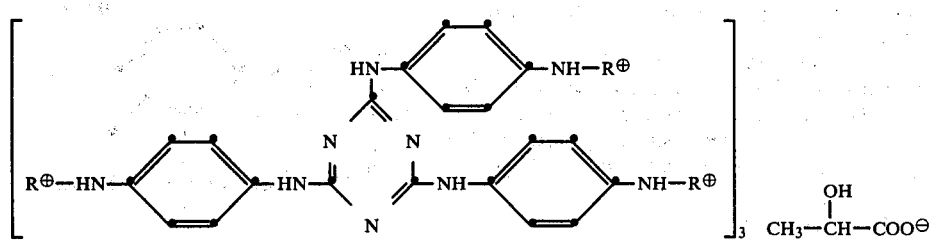

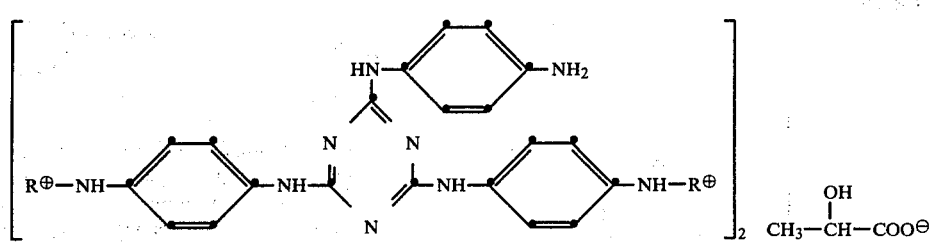

R = 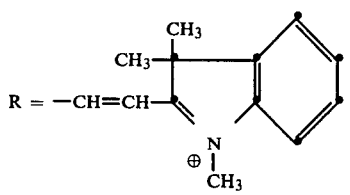

EXAMPLE 3

50 parts of chemically bleached beechwood sulfite are mixed with 50 parts of bleached sulfite RKN 15 (freeness value 22° SR) and 2 parts of the dye mixture according to Example 1 in water (pH 6, water hardness 10° dH, temperature 20° C., ratio of goods to liquor 1:40). After 15 minutes' stirring, paper sheets are produced on a Frank sheet former. The paper has been dyed in a very intense neutral yellow shade. The degree of exhaustion attained is practically 100%, and the fastness to light and to wet processing is excellent.

EXAMPLE 4

A paper web is produced from bleached beech sulfite (22° SR) on a continuously operating laboratory papermaking machine. Ten seconds before the breastbox, an aqueous solution of the dye mixture according to Example 1 is fed continuously, with intense turbulence, into the fibre suspension (0.5% dyeing, ratio of goods to liquor 1:400, water hardness 10° dH, pH 6, temperature 20° C.).

A neutral yellow shade of medium intensity has been imparted to the paper web, and the waste liquor is completely colourless.

EXAMPLE 5

10 parts of cotton fabric (bleached mercerised cotton) are dyed, in a laboratory beam dyeing machine, in 200 parts of a liquor (water hardness 10° dH, pH 4, 3 circulations of the dye liquor per minute) containing 0.05 part of the dye mixture according to Example 1. The temperature is raised in 60 minutes from 20° to 100° C., and is then held constant for 15 minutes. The dye liquor is fully exhausted. There is imparted to the cotton fabric a deeply coloured, neutral-yellow dyeing which is distinguished by good fastness to light and very good fastness to wet processing.

When the same procedure is used to dye a textile fabric made from regenerated (viscose), there is obtained on this material, with the dye mixture of Example 1, a deeply coloured, neutral yellow dyeing having good fastness to light and very good fastness to wet processing.

What is claimed is:

1. A mixture of at least two cationic compounds of the formula

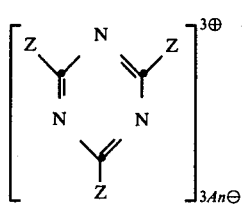

III

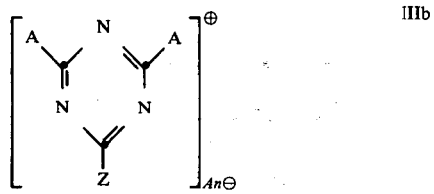

wherein
Z is a radical of the formula

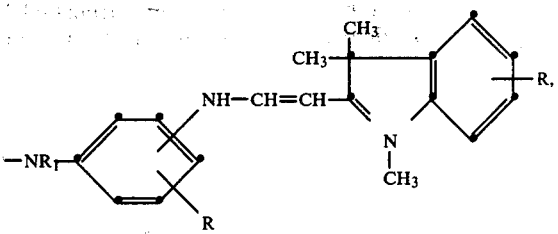

A is a radical of the formula,

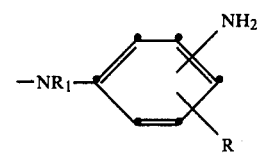

wherein R is hydrogen, $C_1-C_4$-alkyl, $C_1-C_4$-alkoxy or halogen, and $R_1$ is hydrogen or $C_1-C_4$-alkyl, and An is an anion;
which mixture is obtained by reaction of a compound of the formula I

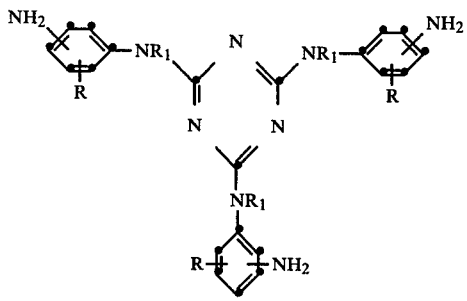

with an aldehyde compound of the formula II

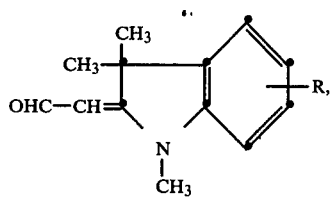

in an aqueous or organic medium, in the presence of an acid, in which formulae, the symbols R and R₁ are as defined in the foregoing.

2. A mixture according to claim 1, which is obtained by reaction of 1 mol of a compound of the formula I with 1.2–2.99 mols of an aldehyde compound of the formula II.

3. A mixture according to claim 1, which is obtained by reaction of 1 mol of a compound of the formula II with 2.8–2.99 mols of an aldehyde compound of the formula II.

4. A mixture according to claim 1, which consists of the compounds of the formulae III and IIIa.

5. A mixture according to claim 1, which consists of the compounds of the formulae III, IIIa and IIIb.

6. A mixture according to claim 1, wherein R and R₁ in each case are hydrogen.

7. A mixture according to claim 1, which is obtained by reaction of a compound of the formula I with an aldehyde compound of the formula II in an aqueous medium at a temperature of 0° to 100° C.

8. A mixture according to claim 1, which is obtained by reaction of a compound of the formula I with an aldehyde compound of the formula II in an organic solvent at a temperature of 0° to 50° C.

9. A mixture according to claim 8, which is obtained by reaction of a compound of the formula I with an aldehyde compound of the formula II in ethanol.

10. The mixtures obtained by the process according to claim 1.

11. The process for dyeing and printing textile materials, leather and paper of all types with a dye mixture according to claim 10.

12. The process according to claim 11 for dyeing and printing polyacrylonitrile materials or acid modified polyester or polyamide materials, and also natural and regenerated cellulose materials.

13. The process according to claim 11 for dyeing and printing lignin-free, bleached and unsized paper.

14. The materials treated or dyed and printed with a mixture obtained according to claim 1.

15. A mixture according to claim 2, wherein R and R₁ in each case are hydrogen.

16. A mixture according to claim 3, wherein R and R₁ in each case are hydroden.

17. A mixture according to claim 4, wherein R and R₁ in each case are hydrogen.

18. A mixture according to claim 5, wherein R and R₁ in each case are hydrogen.

* * * * *